US012306414B2

(12) United States Patent
Ott et al.

(10) Patent No.: US 12,306,414 B2
(45) Date of Patent: May 20, 2025

(54) METHOD AND DEVICE FOR COMPENSATING BEAM ANGLE VARIATIONS OF A BEAM BUNDLE OF LASER BEAMS GENERATED BY A DIFFRACTIVE OPTICAL ELEMENT (71) Applicant: VITRONIC Dr.-Ing. Stein Bildverarbeitungssysteme GmbH, Wiesbaden (DE)

(72) Inventors: Konstantin Ott, Wiesbaden (DE); Burghard Hoffmann, Taunusstein (DE)

(73) Assignee: VITRONIC DR .-ING. STEIN BILDVERARBEITUNGSSYSTEME GMBH, Wiesbaden (DE)

( * ) Notice: Subject to any disclaimer, the term of this patent is extended or adjusted under 35 U.S.C. 154(b) by 283 days.

(21) Appl. No.: 17/724,118

(22) Filed: Apr. 19, 2022

(65) Prior Publication Data
US 2022/0334400 A1    Oct. 20, 2022

(30) Foreign Application Priority Data

Apr. 19, 2021    (EP) .................................... 21169239

(51) Int. Cl.
G02B 27/09    (2006.01)
B23K 26/064   (2014.01)
G02B 27/42    (2006.01)

(52) U.S. Cl.
CPC ........ G02B 27/0944 (2013.01); B23K 26/064 (2015.10); G02B 27/4255 (2013.01)

(58) Field of Classification Search
CPC    G02B 27/0944; G02B 27/4255; G02B 26/10; B23K 26/064; G01B 11/25;
(Continued)

(56) References Cited

U.S. PATENT DOCUMENTS 4,737,798 A     4/1988  Lonis et al.
2002/0093667 A1*  7/2002  Hoffmann ................ G01V 8/14
                                          356/625
(Continued)

FOREIGN PATENT DOCUMENTS

CN    102751658 A    10/2012
CN    103777472 A     5/2014
(Continued)

OTHER PUBLICATIONS

Extended European Search Report issued in corresponding EP Application 21169239.7, issued Oct. 8, 2021, 7 pages.
(Continued)

Primary Examiner — Jyotsna V Dabbi
(74) Attorney, Agent, or Firm — Burris Law, PLLC (57) ABSTRACT A method for compensating beam angle variation of a beam bundle of laser beams with respective beam angles includes generating the beam bundle using a diffractive optical element, determining a beam angle value from a beam angle of at least one laser beam of a first subset of the laser beams, detecting a light pattern projected by a second subset of the laser beams, and evaluating the light pattern. The evaluation is performed taking into account the beam angle variation of the beam angles of the second subset of the laser beams on the basis of the determined beam angle value.

12 Claims, 3 Drawing Sheets (58) Field of Classification Search
CPC . G01B 11/26; G01B 11/2504; G01B 11/2513; G01B 11/2545; G01B 11/026; G01B 21/04; G01B 21/045; G11B 7/0067; G06T 7/74; G06T 7/80; G06T 7/521; G06T 7/73; G06T 7/70; G06T 7/60; G06T 7/50; G06T 7/0002; G06T 2207/10028; G06V 10/761; G06V 30/19093; G06V 2201/12
USPC ................................. 359/566; 382/106, 154
See application file for complete search history.

(56) References Cited

U.S. PATENT DOCUMENTS

| | | |
|---|---|---|
| 2005/0232315 A1 | 10/2005 | Schubert et al. |
| 2016/0073091 A1* | 3/2016 | Hillebrand ................ G06T 7/62 348/48 |
| 2018/0061056 A1 | 3/2018 | Zhao et al. |
| 2020/0242792 A1 | 7/2020 | Liu et al. |

FOREIGN PATENT DOCUMENTS

| | | |
|---|---|---|
| CN | 108711167 | 10/2018 |
| DE | 102014019671 | 9/2017 |

OTHER PUBLICATIONS

Office Action issued in corresponding CN Application No. 202210409515.1, issued Jul. 3, 2024, and an English Translation, 15 pages.

* cited by examiner

METHOD AND DEVICE FOR COMPENSATING BEAM ANGLE VARIATIONS OF A BEAM BUNDLE OF LASER BEAMS GENERATED BY A DIFFRACTIVE OPTICAL ELEMENT

CROSS-REFERENCE TO RELATED APPLICATIONS

This application claims priority to and the benefit of European Patent Application Number 21169239.7 filed on Apr. 19, 2021. The disclosure of the above application is incorporated herein by reference.

FIELD

The present disclosure relates to a method for compensating beam angle variation of a beam bundle of laser beams with respective beam angles, which beam bundle is generated by a diffractive optical element. The application further relates to an arrangement for compensating beam angle variation of a beam bundle of laser beams with respective beam angles, which beam bundle is generated by a diffractive optical element.

BACKGROUND

The statements in this section merely provide background information related to the present disclosure and may not constitute prior art.

In applications where highly accurate knowledge of beam angles is required, the wavelength of the laser light can be stabilized, for example, by closed-loop control. U.S. Pat. No. 4,737,798 discloses a method of preventing mode hopping in laser diodes, in which a stable operating temperature range of the laser diode is identified by reducing the diode biasing current to a predetermined value, thereby achieving a first diode temperature level at which mode hopping occurs, and then increasing the diode modulating current to a predetermined value, thereby achieving a second diode temperature level at which mode hopping occurs. The diode biasing and modulating currents are monitored during operation of the diode. When the predetermined diode biasing current is reached, the diode is heated to increase the diode temperature and prevent the diode from reaching the first temperature level. This prevents the diode from completing a mode hop. Accordingly, when the predetermined diode modulating current is reached, the diode is cooled to lower the diode temperature and prevent the diode from mode hopping at the second temperature level.

An objective can be to provide a simplified arrangement and method without feedback control of the laser light.

SUMMARY

This section provides a general summary of the disclosure and is not a comprehensive disclosure of its full scope or all of its features.

According to one form of the present disclosure, a method for compensating a beam angle variation of a beam bundle of laser beams having respective beam angles is proposed. The method comprises the steps of generating the beam bundle using a diffractive optical element; determining a beam angle value from at least one beam angle of a first subset of the laser beams; detecting a light pattern projected with a second subset of the laser beams; and evaluating the light pattern, wherein the evaluation is performed taking into account the beam angle variation of the beam angles of the second subset of the laser beams on the basis of the determined beam angle value.

The beam angle variation of each laser beam of the beam bundle deflected by the diffractive optical element are related to the underlying wavelength variation of the emitted laser light. By using the first subset of the laser beams to determine the beam angle value, the beam angle variation of all generated beams is traceable and can advantageously be used in the simultaneous or temporally offset evaluation of the detected light pattern of the second subset of the laser beams to compensate for it. The determined beam angle value is not fed back into the laser electronics, but is transferred, for example, to a processing device for evaluating the light pattern using a corresponding software, which performs desired calculations for evaluating the light pattern, such as for a laser triangulation, taking into account the beam angle variation of the beam angles of the second subset of the laser beams on the basis of the determined beam angle value.

Insofar as laser beams or laser diodes are referred to in the context of this disclosure, the skilled person will recognize that the solutions and variations presented herein can be applied to any type of coherent radiation or coherent light sources, so that the term laser radiation is to be understood synonymously with coherent radiation. Diffractive optical elements (DOE) as defined in the disclosure may be used to generate a plurality of laser beams using only one laser beam from a laser source. The laser light from a laser beam is deflected into defined beam angles by interference, so that complex patterns or beams can be generated from one laser beam. The interference of coherent radiation, for example of laser light, is wavelength-dependent, which means that the resulting beam angles of the generated laser beams and thus the entire pattern are also wavelength-dependent. Common laser diodes and other coherent beam sources generally do not emit laser light with a constant wavelength, since a variation of parameters such as the diode current and diode temperature of the laser diodes affect the emitted wavelength of the light. In addition to a steady temperature drift, instantaneous mode hopping can occur. Variations in the wavelength of the laser light lead to beam angle variation in the laser beams deflected by the diffractive optical element, which can be advantageously compensated by the method described. As a special case of a simple DOE, an optical grating, for example a line grating or a slit array, can be used with the method.

According to one form, a data set, for example a so-called look-up table with data, is used for evaluating the light pattern. The data of the data set is adapted depending on the determined beam angle value. If the determined beam angle value deviates from a reference value, the data of the data set can be adjusted, for example, as a function of a difference between the reference value and the determined beam angle value. The data of the data set may concern the reference value as well as an assignment of beam positions and beam angles to the respective laser beams, i.e., their location vectors and direction vectors of the beams, which may be recorded in a previous calibration step, for example. Alternatively, the recorded light pattern can first be modified to form a corrected light pattern, taking into account the determined beam angle value, and then the corrected light pattern can be evaluated without further compensation.

The beam angle value is determined from at least one beam angle of one of the laser beams of the first subset of the laser beams. In the case of only one laser beam, the beam angle value corresponds to the beam angle. In the case of a plurality of laser beams of the first subset of the laser beams, the beam angle value can be formed in a suitable manner from a plurality of beam angles, for example as an average value. According to a variation, the beam angle value may be determined by detecting the beam angle of at least one laser beam of the first subset with at least one optical position sensor. If desired, multiple optical position sensors may be used. Likewise, the beam angles of multiple laser beams can be detected with one optical position sensor. For example, the first subset of laser beams is selected such that at least one laser beam of the first subset is subjected to a substantially greater variation in beam angle in a first of two spatial directions under variation of the wavelength of the laser beam than in the second of the two spatial directions. As a result, the variation of the beam angle is quasi one-dimensional, which advantageously facilitates its determination. A variation of the beam angle in the second spatial direction, orthogonal to the first spatial direction can be tolerated as long as the laser beam can still be detected by the position sensor. A one-dimensional optical position sensor may as well be used if the sensor-axis is aligned with a radial direction extending from a central point of the projected light pattern in a plane of the sensor. The respective laser beam is then subjected to beam angle variation both of the two spatial directions under variation of the wavelength of the laser beam, but the beam is deviated only along the sensor-axis, i.e., the projected laser point will move along the sensor axis. When using two-dimensional sensors, e.g., matrix sensors, the first subset of the laser beams can also be selected arbitrarily, since the variation of the beam angle of at least one laser beam of the first subset is detected in the both two spatial directions in case of a wavelength change.

The beam angle value can advantageously be determined on the basis of a measurement of at least one optical position sensor and a distance from the diffractive optical element to the optical position sensor. The measurement of the optical position sensor, and of any further position sensors is a position deviation of a laser point projected by the respective at least one laser beam of the first subset of the laser beams onto the optical position sensor. With the known distance from the diffractive optical element to the optical position sensor, the beam angle value can be calculated as an angular deviation from a reference value. The optical position sensor may advantageously be fixedly arranged at a predetermined distance from the diffractive optical element.

According to another form, the beam angle value is determined using two laser beam groups of the first subset, wherein the beam angles of the laser beams of the two laser beam groups are detected with two spatially separated optical position sensors. This can be advantageous because it allows additional effects, such as beam pointing, to be detected. The first subset may comprise more than one laser beam, wherein at least two of the laser beams have the same beam angle in one spatial direction and are detected by one and the same optical position sensor. Advantageously, the laser beams of each of the two laser beam groups may each have the same beam angle in one spatial direction and be detected by one and the same optical position sensor. The first subset of the laser beams can be directed to the optical position sensor by means of a deflection device, or a plurality of deflection devices.

Another variation of the present disclosure relates to an arrangement for compensating for beam angle variation of a beam bundle of laser beams having respective beam angles. The arrangement comprises a diffractive optical element for generating the beam bundle, a first sensor arrangement for determining a beam angle value from at least one of the beam angles of a first subset of the laser beams, a second sensor arrangement for detecting a light pattern projected by a second subset of the laser beams, and a processing device for evaluating the light pattern. The processing device being adapted to evaluate the light pattern taking into account the beam angle variation of the beam angles of the second subset of the laser beams on the basis of the determined beam angle value.

The arrangement can be used to compensate for beam angle variation of a beam bundle of laser beams generated by a diffractive optical element with respective beam angles according to the method described above. The features of the method are analogously applicable to the arrangement and vice versa.

According to one form, the first sensor arrangement comprises at least one optical position sensor, in particular at least one position sensitive detector (PSD), which can measure the position of a light spot in one or two dimensions. For example, the first sensor arrangement has two spatially separated optical position sensors, in particular two position sensitive detectors. The optical position sensor can be spatially positioned in such a way that each laser beam of the first subset detected by the optical position sensor is subjected to a substantially greater variation of the beam angle in a first of two spatial directions in the event of a wavelength variation of the laser beam than in the second of the two spatial directions, so that advantageously a one-dimensional detection of the light spot is sufficient. A deflection device can be provided for deflecting the laser beams of the first subset in the direction of the first sensor arrangement.

The second sensor arrangement can be equipped with optical position sensors or other optical sensors which detect the projected light pattern or record an image of the light pattern. The processing device for evaluating the light pattern can be a computer with a data carrier on which software is executed for evaluating the light pattern taking into account the beam angle variation of the beam angles of the second subset of the laser beams.

The first sensor arrangement may have a predetermined distance from the diffractive optical element, which distance is advantageously used for determining the beam angle value. The first sensor arrangement and the diffractive optical element may further both be assigned to an illumination, for example arranged inside a housing of the illumination, wherein only the second subset of the laser beams emerges from the illumination or the illumination housing for projecting the light pattern.

Another variation of the present disclosure relates to a use of the previously described arrangement for laser triangulation, wherein an input laser beam is diffracted by a diffractive optical element to form a beam bundle of laser beams having respective beam angles, and the beam angle variation is compensated for by the previously described method.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
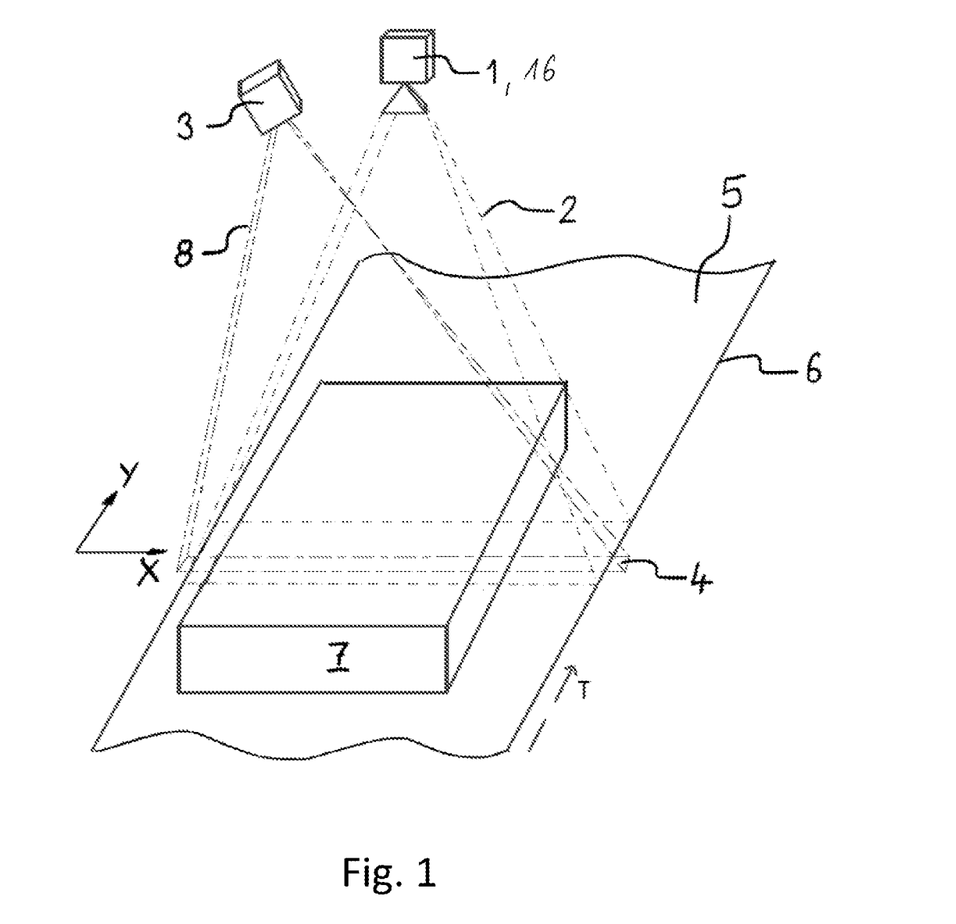
FIG. 1 is a perspective view of a measuring arrangement for the three-dimensional measurement of objects as an example of the application of a method for compensating beam angle variation of a beam bundle of laser beams generated by a diffractive optical element according to the principles of the present disclosure.
Figure 2:
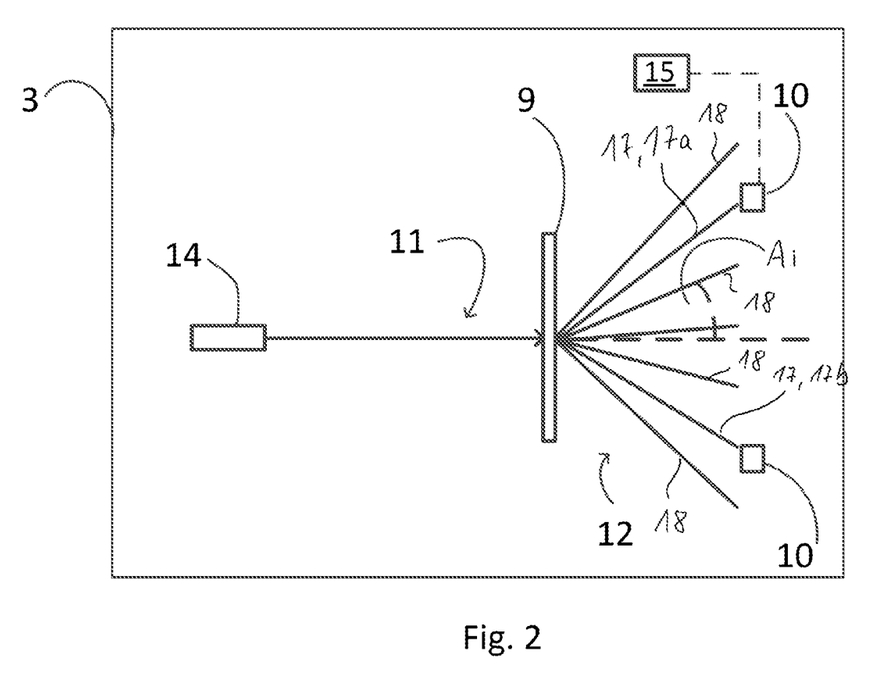
FIG. 2 is a schematic representation of an arrangement for compensating beam angle variation of a beam bundle of laser beams generated by a diffractive optical element.

FIG. 1 shows in a perspective schematic view a surveying arrangement or assembly for three-dimensional surveying of objects 7, for example, by decoding a code word defined by a light pattern 4, which can be used for measuring a height and a height profile of the object 7. The device, which is described in more detail in European patent application No. 20180153.7, which is in incorporated herein by reference, serves as an application example of a method for compensating beam angle variation of a beam bundle 12 of laser beams, which is generated by a diffractive optical element 9 (FIG. 2). The method comprises the steps of determining a beam angle value from at least one beam angle Ai of a first subset 17 of the laser beams, detecting the light pattern 4 projected with a second subset 18 of the laser beams, and evaluating the light pattern 4, wherein the evaluation is performed taking into account the beam angle variation of the beam angles of the second subset 18 of the laser beams on the basis of the determined beam angle value.

An arrangement for carrying out the method according to FIG. 2 has a first sensor arrangement 10 for determining the beam angle value from at least one beam angle of the first subset 17 of the laser beams, a second sensor arrangement 16 for detecting the light pattern 4 projected by the second subset 18 of the laser beams, and a processing device 15 for evaluating the light pattern 4 taking into account the beam angle variation of the beam angles of the second subset 18 of the laser beams on the basis of the determined beam angle value.

The surveying arrangement shown in FIG. 1 comprises a detection device 1 with the second sensor arrangement 16 for detecting the light pattern 4 projected by the second subset 18 of the laser beams, for example with optical sensors which detect the projected light pattern 4 or record an image of the light pattern 4. The detecting device 1 has a viewing range or area 2, which can be appreciated in the present perspective illustration. The viewing range 2 of the detecting device 1 is indicated by dash-dotted lines. The viewing range 2 of the detecting device 1 fans out in a direction of an axis X and, to a lesser extent, in a transport direction T transverse to the axis X. The surveying arrangement further comprises an illumination 3 projecting the light pattern 4 in the direction of a reference plane 5. The reference plane 5 is defined by a surface of a conveyor belt 6. The conveyor belt 6 is driven in the transport direction T. An object 7, for example in the form of a package, is moved in the transport direction T on the conveyor belt 6.

The illumination 3 projects the light pattern 4 onto the conveyor belt 6 and onto the object 7 with the second subset 18 of the laser beams in a projection area 8, wherein the light pattern 4 may be strip-shaped in the direction of the axis X. The projection area 8 is indicated by dashed lines. The object 7 is conveyed through the projection area 8 and through the viewing area 2. Where the object 7 is conveyed through the projection area 8, the projection area 8 and the viewing area 2 are coplanar or overlapping with each other. This means that the detecting device 1 can always detect the light pattern 4 projected onto the object 7 in the area in which the object 7 is conveyed through the projection area 8. In this case, the viewing area 2 is fanned out in the transport direction T at least as far as the projection area 8. Thus, the light pattern 4 is always located in the viewing area 2 of the detecting device 1.

FIG. 2 shows a schematic representation of the arrangement for compensating beam angle variation of the beam bundle 12 of laser beams, which beam bundle is generated by the diffractive optical element 9. The diffractive optical element 9 can be associated with the illumination 3 in FIG. 1, for example. The diffractive optical element 9 can be arranged inside a housing of the illumination 3. A light source 14 emits an input laser beam 11 onto the diffractive optical element 9, hereinafter also referred to as DOE 9 for short, possibly via deflection elements, such as mirrors. Through the DOE 9, the input laser beam 11 is fanned out forming the light pattern 4. When the laser beam 11 passes through the DOE 9, the beam is split into the beam bundle 12 by interference. Each laser beam of the beam bundle 12 is deflected by an individual beam angle Ai with respect to the input laser beam 11. The beam angles Ai are defined by parameters of the DOE 9 and the wavelength of the incident light of the input laser beam 11. If the beam angle Ai of any laser beam of the beam bundle 12 is known, a correction of the beam angles can be performed for all other laser beams of the beam bundle 12.

The laser beams of the beam bundle 12 are distinguished into the first subset 17 of the laser beams and the second subset 18 of the laser beams. The first sensor arrangement 10 for determining the beam angle value from at least one of the beam angles of the first subset 17 of the laser beams may be associated with the illumination 3, for example arranged inside the housing of the illumination 3 together with the diffractive optical element 9, as in the exemplary form shown. In this case, the laser beams of the first subset 17 do not leave the illumination 3, but only the laser beams of the second subset 18 for projecting the light pattern 4. The second sensor arrangement 16 for detecting the light pattern 4 projected by the second subset 18 of the laser beams is associated with the detecting device 1 (FIG. 1). A processing device 15 is provided for evaluating the light pattern 4 taking into account the beam angle variation of the beam angles of the second subset 18 of the laser beams on the basis of the determined beam angle value of the first subset 17 of the laser beams. For transferring the determined beam angle value of the first subset 17 of the laser beams from the first sensor arrangement 10 to the processing device 15, there is a connection schematically shown by the broken line. The processing device 15 itself may alternatively be associated with the detecting device 1 or the illumination 3 or may be associated with neither the detecting device 1 nor the illumination 3. The first sensor arrangement 10 comprises, for example, at least one optical position sensor, in particular at least one position sensitive detector. In the example illustrated, the first sensor arrangement 10 has two spatially separated position sensitive detectors. The beam angle value is thus determined on the basis of two laser beam groups 17a, 17b of the first subset 17, wherein the beam angles of the laser beams of the two laser beam groups 17a, 17b are detected with the two spatially separated optical position sensors of the first sensor arrangement 10. Thus, the first subset 17 may comprise more than one laser beam. Furthermore, each of the two laser beam groups 17a, 17b may comprise at least two laser beams which, for example, have the same beam angle in a spatial direction and can thus advantageously be detected by one and the same optical position sensor of the first sensor arrangement 10. The optical position sensor of the first sensor arrangement 10 is spatially positioned in such a way that each laser beam of the first subset 17 detected by the optical position sensor experiences a substantially greater variation of the beam angle in a first of two spatial directions in the event of a wavelength change of the laser beam than in the second of the two spatial directions. Thus, the optical position sensor advantageously needs to detect the position of the laser beam in only one direction. The optical position sensors of the first sensor arrangement 10 are used to detect mode hopping and further the temperature drift within one mode plateau of the laser light source 14 based on the detected laser beams of the first subset 17.

The method is explained in more detail below with reference to FIGS. 1 to 3 collectively. The second subset 18 of the laser beams generated by the DOE 9 form the light pattern 4 of, for example, laser beams projected onto the object 7 to allow three-dimensional measurement of an object surface of the object 7, for example in the package sorting process when the object 7 or packages are moved along the conveyor belt 6. Here, laser triangulation, wherein the laser illumination 3 is arranged offset from the detecting device 1, is used to determine the height pattern of the object 7. The projected light pattern 4 of laser dots is detected by the second sensor arrangement 16, and the position of the laser dots is continuously analyzed at each detection or in each image. More details are described in document EP 2 728 305 A1, which is incorporated herein by reference. The principle of laser triangulation desires that the beam angles Ai of the laser beams of the second subset 18 are known precisely, if possible, at any time or during each acquisition or image capture, since they are fundamental for the distance calculation of the object 7 to be measured. For this purpose, a highly accurate data set, for example as a lookup table (LUT), of all beam angles is generated in a calibration step before use (beam LUT). If fast data processing is of secondary importance, the beam information can also be stored in other parameter data sets. If, as an example, only one spatial direction is considered for the deflection of the laser beams, the following applies for all beam angles:

$$\sin(Ai) = \lambda * ki \quad \text{(formula 1)},$$

wherein ki represent the spatial frequencies encoded in the surface structure of DOE 9, $\lambda$ the wavelength of the emitted laser light, and $\lambda * ki$ a product of $\lambda$ and ki. Now, if the wavelength $\lambda$ of the incident light changes, the beam angle of each outgoing laser beam of the beam bundle 12 changes accordingly, possibly with the exception of a central laser beam that is not deflected due to its k-value of zero. The beam angle Ai of each deflected laser beam of the beam bundle 12 thus allows to infer the wavelength change and, by the known DOE parameters ki, the angle change of all other emerging laser beams. Therefore, only the beam angle value from at least one beam angle of the first subset 17 of the laser beams needs to be detected to know the wavelength related beam angle variation of the laser beams generated by the DOE 9 of the second subset 18 of the laser beams. This is then used in the evaluation of the light pattern 4, wherein the evaluation is performed taking into account the beam angle variation of the beam angles of the second subset 18 of the laser beams on the basis of the detected beam angle value, for example by correcting the stored beam angle LUT for the current beam angle variation.

For this purpose, the DOE 9 is designed, for example, in such a way that the two laser beam groups 17a, 17b are projected below the light pattern 4 for the three-dimensional measurement of the object 7, which are used to measure the beam angles of the laser beams of the first subset 17. These two laser beam groups 17a, 17b are each projected onto or deflected to one of the optical position sensors of the first sensor arrangement 10. Mirrors not shown here, for example, can be used as deflecting elements. Each of the laser beam groups 17a, 17b consists, for example, of three laser beams very close together. Position sensitive detectors (PSD) of the first sensor arrangement 10 are used as optical position sensors, for example. Alternatively, line or matrix image sensors can also be used. In the following, the abbreviation PSD is also used as a representative of all applicable sensor types. Basic functionality is already achieved with only one laser beam group 17a and only one PSD for detecting the beam angle. If two laser beam groups 17a, 17b are used with beam angles Ai of different sign, i.e. which are deflected in opposite directions from the direction of the incident laser beam 11, a further advantage results. If two laser beam groups 17a, 17b are detected by the two position sensors of the first sensor arrangement 10 after the same optical path length, then in the case of a purely wavelength-related variation of the beam angles Ai, a variation identical in absolute value but opposite in sign is registered. If, in addition, the beam angle Ai is affected by further effects, such as beam pointing or mechanical misalignment of the laser light source 14 or, if applicable, of deflection optics before passing through the DOE 9, these changes are perceived identically in magnitude and direction of movement on both PSDs of the first sensor arrangement 10. Thus, it is advantageous to distinguish between the influence of the wavelength and other influences. If other effects besides the influence of the wavelength change are assumed to be small, the measured values for the correction of the beam LUT can already be recorded with a laser beam of the first subset 17 and a PSD of the first sensor arrangement 10. The laser spot movements recorded by the PSDs of the first sensor arrangement 10 are converted into beam angle variation using the known geometry of the setup. The beam angle value represents the beam angle resulting from the beam angle variation. The term beam angle value is used to distinguish it from the beam angle Ai of a single laser beam. From the beam angle variation, the underlying wavelength variation $\Delta\lambda$ can be determined from formula 1, which in turn can be used to calculate the variation of all beam angles Ai. With the information about the beam angle variation of all laser beams of the second subset 18, the beam LUT can be updated in software before processing each light pattern 4. This updated beam LUT can then be used to perform laser triangulation, adjusted for the spurious effect of wavelength change (and other effects, if any). Beam angle variation caused by wavelength changes in the sub-nanometer range can thus be registered, for example with a resolution of less than 0.5 nanometer, in particular of about 0.2 nanometer. For the determination of a wavelength of the laser beams, the described arrangement can also be used alternatively and or additionally as a low-cost wavemeter variant after prior calibration.

Figure 3:
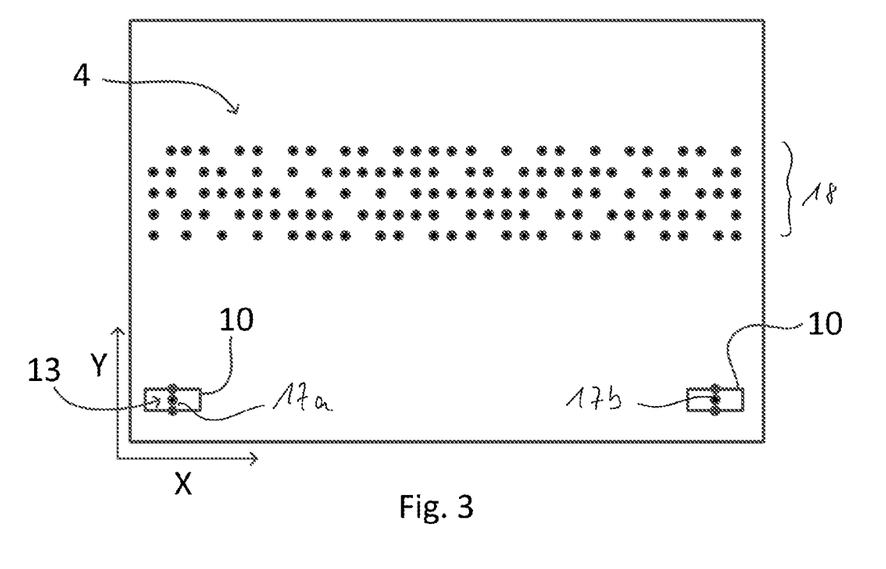
FIG. 3 is a schematic representation of a first subset of the laser beams for determining a beam angle value generated according to the method and a light pattern, as projected according to the method, of a second subset of the laser beams according to FIG. 2.

In FIG. 3, the projected light pattern 4 is shown, wherein columns of the light pattern 4 are formed in the direction of the axis X. Below the actual light pattern 4, the two laser beam groups 17a, 17b of the first subset 17 are shown. These each have three laser beams, the light points of which are shown as measuring points 13 on those of the position sensitive detectors of the first sensor arrangement 10. The measuring points 13 can, for example, be arranged next to each other perpendicular to a measuring axis of the PSD in a Y-axis direction. This allows simple and fast assembly, since precise adjustment of the PSD to a single laser point is not desired. The PSDs of the first sensor arrangement 10 are aligned in such a way that only a measurement along the X-axis, i.e., a one-dimensional movement of the beam angle variation caused by the wavelength variation, takes place. Compensation of the beam LUT of the beam angles Ai is performed with a computer program of the processing device 15 for evaluating the light pattern 4, by adjusting the data of the data set when the determined beam angle value deviates from a reference value, depending on a difference between the reference value and the determined beam angle value.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for compensating beam angle variation of a beam bundle of laser beams with respective beam angles, the method comprising:
generating the beam bundle using a diffractive optical element;
determining a beam angle value from a beam angle of at least one laser beam of a first subset of the laser beams using at least one optical position sensor arranged at a predetermined distance from the diffractive optical element, wherein the beam angle value is determined based on a measurement of the at least one optical position sensor detecting the beam angle of the at least one laser beam of the first subset of the laser beams and the predetermined distance from the diffractive optical element to the at least one optical position sensor;
detecting a light pattern projected by a second subset of the laser beams; and
evaluating the light pattern, wherein the evaluation is performed taking into account the beam angle variation of the beam angles of the second subset of the laser beams based on the determined beam angle value.

2. The method according to claim 1, wherein a data set with data is used for evaluating the light pattern, wherein the data is adapted in dependence on the determined beam angle value.

3. The method according to claim 2, wherein the data of the data set is adjusted in case of a deviation of the determined beam angle value from a reference value depending on a difference between the reference value and the determined beam angle value.

4. The method according to claim 1, wherein the detected light pattern is modified to form a corrected light pattern taking into account the determined beam angle value, and wherein the corrected light pattern is evaluated.

5. The method according to claim 1, wherein the first subset of the laser beams is selected such that the at least one laser beam of the first subset is subjected to a substantially greater change in beam angle in a first of two spatial directions than in a second of the two spatial directions upon a change in wavelength of the laser beam.

6. The method according to claim 1, wherein the beam angle value is determined using two laser beam groups of the first subset of the laser beams, wherein the beam angles of the laser beams of the two laser beam groups are detected with two spatially separated optical position sensors.

7. The method according to claim 1, wherein the first subset of the laser beams comprises more than one laser beam, wherein at least two of the laser beams have the same beam angle in one spatial direction and are detected by one and the same optical position sensor.

8. An assembly for compensating beam angle variation of a beam bundle of laser beams with respective beam angles, the assembly comprising:
- a diffractive optical element for generating the beam bundle of the laser beams;
- a first sensor arrangement comprising at least one optical position sensor for determining a beam angle value from the beam angle of at least one of the laser beams of a first subset of the laser beams, the first sensor arrangement having a predetermined distance from the diffractive optical element;
- a second sensor arrangement for detecting a light pattern projected by a second subset of the laser beams; and
- a processing device for evaluating the light pattern, wherein the processing device is adapted to evaluate the light pattern taking into account the beam angle variation of the beam angles of the second subset of the laser beams based on the determined beam angle value, wherein the first sensor arrangement and the diffractive optical element are both assigned to an illumination, wherein only the second subset of the laser beams emerges from the illumination for projecting the light pattern, and wherein the first subset of the laser beams reaches the first sensor arrangement after travelling the predetermined distance from the diffractive optical element along the illumination.

9. The assembly according to claim 8, wherein the at least one optical position sensor comprises two spatially separated optical position sensors.

10. The assembly according to claim 8, wherein the at least one optical position sensor is spatially positioned such that each laser beam of the first subset of the laser beams detected by the position sensor is subjected to a substantially greater change in beam angle in a first of two spatial directions than in a second of the two spatial directions upon a change in wavelength of the laser beam.

11. The assembly according to claim 8, wherein a deflection device is provided for deflecting the laser beams of the first subset in a direction of the first sensor arrangement.

12. The assembly according to claim 8, wherein the first sensor arrangement and the diffractive optical element are both arranged inside a housing of the illumination.

\* \* \* \* \*